US010688447B2

(12) United States Patent
Sanguineti et al.

(10) Patent No.: US 10,688,447 B2
(45) Date of Patent: Jun. 23, 2020

(54) PROCESS FOR MANUFACTURING FLUOROPOLYMER MEMBRANES

(71) Applicant: SOLVAY SPECIALTY POLYMERS ITALY S.P.A., Bollate (IT)

(72) Inventors: Aldo Sanguineti, Milan (IT); Emanuele Di Nicolo', Paderno Dugnano (IT); Young Moo Lee, Seoul (KR); Enrico Drioli, Naples (IT); Zhaoliang Cui, Seoul (KR); Naser Tavajohi Hassankiadeh, Seoul (KR); Suk Young Lee, Seoul (KR)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 638 days.

(21) Appl. No.: 15/028,594

(22) PCT Filed: May 23, 2014

(86) PCT No.: PCT/EP2014/060629
§ 371 (c)(1),
(2) Date: Apr. 11, 2016

(87) PCT Pub. No.: WO2015/051928
PCT Pub. Date: Apr. 16, 2015

(65) Prior Publication Data
US 2016/0243506 A1 Aug. 25, 2016

(30) Foreign Application Priority Data

Oct. 11, 2013 (EP) .................................... 13188227

(51) Int. Cl.
B01D 71/34 (2006.01)
B01D 67/00 (2006.01)
B01D 71/32 (2006.01)
B01D 69/04 (2006.01)
B01D 69/06 (2006.01)
H01M 2/14 (2006.01)
H01M 2/16 (2006.01)
H01M 10/0525 (2010.01)
B01D 71/80 (2006.01)

(52) U.S. Cl.
CPC .......... B01D 71/34 (2013.01); B01D 67/002 (2013.01); B01D 67/0011 (2013.01);
(Continued)

(58) Field of Classification Search
CPC .... B01D 71/34; B01D 67/0083; B01D 69/06; B01D 67/002; B01D 69/04; B01D 71/32;
(Continued)

(56) References Cited

U.S. PATENT DOCUMENTS 5,013,339 A 5/1991 Mahoney et al.
2005/0098494 A1 5/2005 Mullette et al.
(Continued)

FOREIGN PATENT DOCUMENTS

WO 2009092795 A1 7/2009
WO WO-2013155659 A1 * 10/2013 ............... C08K 5/20

OTHER PUBLICATIONS

Porter M.C., "Handbook of Industrial Membrane Technology'", 1990, pp. 70-78, Noyes Publications.
Smolders K. et al., "Terminology for membrane distillation", Desalination, 1989, 72, p. 249-262—Elsevier Science Publishers B.V., Amsterdam.
Rhodia: "Rhodiasolv Polarclean", Jun. 30, 2012.
Royal Society: "Supplementary material: Coordinates in PCA space and bibliographical sources for the listed green solvents.", Dec. 31, 2012, XP055153793, Retrieved from the Internet: URL:http://www.rsc.org/suppdata/gc/c2/c2gc16515e/c2gc16515e_2.pdf [retrieved on Nov. 18, 2014].
Scialdone O. et al., "Effective recovery of perfluoropolyether surfactants from PVDF and PTFE by supercritical carbon dioxide extraction", Journal of Supercritical Fluids, 2007, vol. 39, No. 3, pp. 347-353, XP005757978—Elsevier B.V.

*Primary Examiner* — Taiwo Oladapo

(57) ABSTRACT

The present invention pertains to a process for manufacturing a fluoropolymer membrane, said process comprising the following steps: (i) providing a composition [composition (C)] comprising, preferably consisting of: at least one fluoropolymer [polymer (F)], a water-soluble liquid medium [medium ($M_{ws}$)] comprising, preferably consisting of at least one solvent selected from the group consisting of diesters of formula (I-$_{de}$), esteramides of formula (I-$_{ea}$) and diamides of formula (I-$_{da}$); $R^1$ (O=)CO-$A_{de}$-OC(=O)$R^2$ (I-$_{de}$) $R^1O(O=)C$-$A_{ea}$-C(=O)$NR^3R^4$ (I-$_{ea}$) $R^5R^6N(O=)C$-$A_{da}$-C(=O)$NR^5R^6$ (I-$_{da}$) wherein: $R^1$ and $R^2$, equal to or different from each other, are independently selected from the group consisting of $C_1$-$C_{20}$ hydrocarbon groups; $R^3$, $R^4$, $R^5$ and $R^6$, equal to or different from each other, are independently selected from the group consisting of hydrogen, $C_1$-$C_{36}$ hydrocarbon groups, possibly substituted, being understood that $R^3$, $R^4$, $R^5$ and $R^6$ might be part of a cyclic moiety including the nitrogen atom to which they are bound, said cyclic moiety being possibly substituted and/or possibly comprising one or more than one additional heteroatoms, $A_{de}$ is a $C_3$-$C_{10}$ divalent alkylene group comprising one or more ether oxygen atoms, $A_{ea}$ and $A_{da}$, equal to or different from each other, are independently $C_3$-$C_{10}$ divalent alkylene groups, optionally comprising one or more ether oxygen atoms and/or one or more functional side groups; (ii) processing the composition (C) at a temperature of at least 100° C. thereby providing a film; (iii) cooling the film provided in step (ii) to a temperature below 50° C.; (iv) contacting the film provided in step (iii) with a non-solvent medium [medium (M NS)] thereby providing a fluoropolymer membrane; and (v) optionally, drying the fluoropolymer membrane provided in step (iv).

20 Claims, No Drawings

(52) U.S. Cl.
CPC ......... *B01D 67/0083* (2013.01); *B01D 69/04* (2013.01); *B01D 69/06* (2013.01); *B01D 71/32* (2013.01); *H01M 2/145* (2013.01); *H01M 2/1653* (2013.01); *H01M 10/0525* (2013.01); *B01D 71/80* (2013.01); *B01D 2323/08* (2013.01); *B01D 2325/022* (2013.01); *B01D 2325/24* (2013.01)

(58) Field of Classification Search
CPC .......... B01D 67/0011; B01D 2325/022; B01D 2325/24; B01D 2323/08; B01D 71/80; H01M 2/1653; H01M 2/145; H01M 10/0525
See application file for complete search history.

(56) References Cited

U.S. PATENT DOCUMENTS

| | | | |
|---|---|---|---|
| 2013/0266723 A1* | 10/2013 | Cheng | C08K 5/11 427/58 |
| 2015/0083025 A1* | 3/2015 | Cheng | C08K 5/20 106/503 |

\* cited by examiner

PROCESS FOR MANUFACTURING FLUOROPOLYMER MEMBRANES

This application is a U.S. national stage entry under 35 U.S.C. § 371 of International Application No. PCT/EP2014/060629 filed May 23, 2014, which claims priority to European application No. 13188227.6 filed on Oct. 11, 2013. The entire contents of these applications are explicitly incorporated herein by this reference.

TECHNICAL FIELD

The present invention pertains to a process for manufacturing fluoropolymer membranes.

BACKGROUND ART

Fluorinated polymers including polyvinylidene fluoride (PVDF) and ethylene-chlorotrifluoroethylene copolymers (ECTFE) are widely used in the preparation of microfiltration and ultrafiltration membranes due to their good thermal stability, chemical resistance, excellent processability and convenience in controlling the porosity and the morphology of the membranes thereby provided.

Membranes are typically manufactured by using solutions of fluorinated polymers in suitable solvents. According to known techniques, a clear polymer solution is precipitated into two phases: a solid, polymer-rich phase that forms the matrix of the membrane, and a liquid, polymer-poor phase that forms the membrane pores. Polymer precipitation from a solution can be achieved in several ways, such as cooling, solvent evaporation, precipitation by immersion in water, or imbibition of water from the vapour phase. If precipitation is rapid, the pore-forming liquid droplets tend to be small and the membranes formed are markedly asymmetric. If precipitation is slow, the pore-forming liquid droplets tend to agglomerate while the casting solution is still fluid, so that the final pores are relatively large and the membrane structure is more symmetrical.

In these techniques, it remains nevertheless key to provide for stable and homogeneous solutions of fluorinated polymers as starting materials.

The vast majority of fluorinated polymers can be readily dissolved in suitable solvents to form stable solutions. These solvents include N-methylpyrrolidone (NMP), N,N-dimethylacetamide (DMAc), N,N-dimethylformamide (DMF), dimethyl sulphoxide (DMSO) and phthalates.

With regards to NMP, DMF and DMAc, which have been since years the solvents of choice in the industry for solution-based hollow-fiber spinning processes in the manufacture of PVDF membranes, these solvents are now facing environmental and safety concerns, having regards to the safety risks associated to their handling and to possible leakage/emissions in the environment, so questing for substitution.

For instance, NMP has been notably classified according to the European regulation (EC) No1272/2008 in the hazard class Repr.1B code H360D (may damage the unborn child), Eye Irrit.2 code H319, STOT SE 3 code H335, Skin Irrit.2 H315 and according to the European directive 67/548/EEC it is classified as Reprotoxic Cat2 code R61, Xi codes R36/37/38. Further more it is submitted to the Toxic Release Inventory (SARA Title III Section 313).

Similarly, DMAc is covered by index number 616-011-00-4 of Regulation (EC) No 1272/2008 in Annex VI, part 3, Table 3.1 (the list of harmonised classification and labelling of hazardous substances) as toxic for reproduction category 1B (H360D: "May damage the unborn child"). The corresponding classification in Annex VI, part 3, Table 3.2 (the list of harmonised classification and labelling of hazardous substances from Annex I to Directive 67/548/EEC) of Regulation (EC) No 1272/2008 is toxic to reproduction category 2 (R61: "May cause harm to the unborn child").

Also, DMF has been classified as toxic to reproduction category 1B (H360D: "May damage the unborn child") according to Regulation (EC) No 1272/2008 and is included in Annex VI, part 3 (index number 616-001-00-X), Table 3.1 (list of harmonised classification and labelling of hazardous substances). The corresponding classification in Annex VI, part 3, Table 3.2 (the list of harmonised classification and labelling of hazardous substances from Annex I to Directive 67/548/EEC) of Regulation (EC) No 1272/2008 is toxic to reproduction category 2 (R61: "May cause harm to the unborn child.").

The present invention thus provides a solution for obviating to environmental and safety concerns which arise in using NMP, DMF, DMAc, phthalates or other similar solvents and provides an alternative process for manufacturing membranes.

SUMMARY OF INVENTION

It has been now found that fluoropolymer membranes having outstanding mechanical properties and water flux properties can be easily manufactured according to the process of the invention by advantageously using water-soluble liquids having a positive environmental profile.

In a first instance, the invention pertains to a process for manufacturing a fluoropolymer membrane, said process comprising the following steps: (i) providing a composition [composition (C)] comprising, preferably consisting of:
  at least one fluoropolymer [polymer (F)],
  a water-soluble liquid medium [medium ($M_{WS}$)] comprising, preferably consisting of, at least one solvent selected from the group consisting of diesters of formula (I-$_{de}$), esteramides of formula (I-$_{ea}$) and diamides of formula (I-$_{da}$):

$$R^1(O{=})CO\text{-}A_{de}\text{-}OC({=}O)R^2 \qquad (I\text{-}_{de})$$

$$R^1O(O{=})C\text{-}A_{ea}\text{-}C({=}O)NR^3R^4 \qquad (I\text{-}_{ea})$$

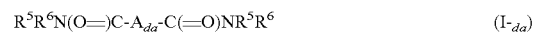
$$R^5R^6N(O{=})C\text{-}A_{da}\text{-}C({=}O)NR^5R^6 \qquad (I\text{-}_{da})$$

wherein:
  $R^1$ and $R^2$, equal to or different from each other, are independently selected from the group consisting of $C_1$-$C_{20}$ hydrocarbon groups;
  $R^3$, $R^4$, $R^5$ and $R^6$, equal to or different from each other, are independently selected from the group consisting of hydrogen, $C_1$-$C_{36}$ hydrocarbon groups, possibly substituted, being understood that $R^3$, $R^4$, $R^5$ and $R^6$ might be part of a cyclic moiety including the nitrogen atom to which they are bound, said cyclic moiety being possibly substituted and/or possibly comprising one or more than one additional heteroatoms,
  $A_{de}$ is a $C_3$-$C_{10}$ divalent alkylene group comprising one or more ether oxygen atoms,
  $A_{ea}$ and $A_{da}$, equal to or different from each other, are independently $C_3$-$C_{10}$ divalent alkylene groups, optionally comprising one or more ether oxygen atoms and/or one or more functional side groups;
(ii) processing the composition (C) at a temperature of at least 100° C. thereby providing a film;

(iii) cooling the film provided in step (ii) to a temperature below 50° C.;
(iv) contacting the film provided in step (iii) with a non-solvent medium [medium ($M_{NS}$)] thereby providing a fluoropolymer membrane; and
(v) optionally, drying the fluoropolymer membrane provided in step (iv).

It has been found that the polymer (F) can be advantageously dissolved in the medium ($M_{WS}$) at a temperature of at least 100° C. thereby providing a homogeneous composition (C) that can be advantageously processed into a homogeneous film. The film so obtained can be also advantageously solidified by cooling to a temperature below 50° C. The medium ($M_{WS}$) can then be removed therefrom by contacting said film with the medium ($M_{NS}$) thereby successfully providing a fluoropolymer membrane.

In a second instance, the invention pertains to a fluoropolymer membrane obtainable by the process of the invention.

In a third instance, the invention pertains to use of the fluoropolymer membrane of the invention as filtration membrane.

The filtration membrane may be either a liquid-filtration membrane such as a water-filtration membrane or a gas-filtration membrane.

In a fourth instance, the invention pertains to use of the fluoropolymer membrane of the invention for the manufacture of a separator membrane for electrochemical devices.

The separator membrane for electrochemical devices of the invention is advantageously obtainable by contacting the fluoropolymer membrane of the invention with one or more electrolytes.

Non-limitative examples of suitable separator membranes for electrochemical devices include, notably, separator membranes for secondary batteries, preferably separator membranes for Lithium-ion batteries.

The term "membrane" is used herein in its usual meaning, that is to say that it refers to a discrete, generally thin, interface that moderates the permeation of chemical species in contact with it, said membrane containing pores of finite dimensions.

Membranes are generally characterised by their average pore diameter and average porosity.

Suitable techniques for the determination of the average pore diameter in porous membranes are described for instance in Handbook of Industrial Membrane Technology. Edited by PORTER, Mark C. Noyes Publications, 1990. p. 70-78.

Suitable techniques for the determination of the average porosity in porous membranes are described for instance in SMOLDERS, K., et al. Terminology for Membrane Distillation. *Desalination.* 1989, vol. 72, p. 249-262.

Membranes containing pores homogeneously distributed throughout their thickness are generally known as symmetric (or isotropic) membranes; membranes containing pores which are heterogeneously distributed throughout their thickness are generally known as asymmetric (or anisotropic) membranes.

Membranes can be in the form of flat membranes or in the form of tubular membranes.

Tubular membranes typically have a diameter greater than 3 mm. Tubular membranes having a diameter comprised between 0.5 mm and 3 mm are typically referred to as capillary membranes. Tubular membranes having a diameter of less than 0.5 mm are typically referred to as hollow fibers membranes.

Flat membranes are generally preferred when high fluxes are required whereas hollow fibers membranes are particularly advantageous in applications wherein compact modules having high surface areas are required.

Depending on their specific applications, membranes may also be supported onto substrates in order to improve their mechanical resistance.

The substrate is generally made of materials having a minimal influence on the selectivity of the membrane thereby provided.

For the purpose of the present invention, the term "fluoropolymer [polymer (F)]" is understood to mean a fluoropolymer comprising recurring units derived from at least one fluorinated monomer [monomer (F)].

By the term "fluorinated monomer [monomer (F)]" it is hereby intended to denote an ethylenically unsaturated monomer comprising at least one fluorine atom.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The monomer (F) can further comprise one or more other halogen atoms (Cl, Br, I). Should the monomer (F) be free of hydrogen atoms, it is designated as per(halo)fluoromonomer [monomer (FF)]. Should the monomer (F) comprise at least one hydrogen atom, it is designated as hydrogen-containing fluorinated monomer [monomer (FH)].

Non limitative examples of suitable monomers (F) include, notably, the followings:
$C_3$-$C_8$ perfluoroolefins such as tetrafluoroethylene (TFE) and hexafluoropropene (HFP);
$C_2$-$C_8$ hydrogenated fluoroolefins such as vinyl fluoride, vinylidene fluoride (VDF) and 1,2-difluoroethylene and trifluoroethylene (TrFE);
perfluoroalkylethylenes of formula $CH_2$=$CH$—$R_{f0}$ wherein $R_{f0}$ is a $C_1$-$C_6$ perfluoroalkyl group;
chloro- and/or bromo- and/or iodo-$C_2$-$C_6$ fluoroolefins such as chlorotrifluoroethylene (CTFE);
(per)fluoroalkylvinylethers of formula $CF_2$=$CFOR_{f1}$ wherein $R_{f1}$ is a $C_1$-$C_6$ fluoro- or perfluoroalkyl group, $CF_3$, $C_2F_5$, $C_3F_7$;
$CF_2$=$CFOX_0$ (per)fluoro-oxyalkylvinylethers, wherein $X_0$ is a $C_1$-$C_{12}$ alkyl group, a $C_1$-$C_{12}$ oxyalkyl group or a $C_1$-$C_{12}$ (per)fluorooxyalkyl group comprising one or more ether groups, such as perfluoro-2-propoxy-propyl group;
(per)fluoroalkylvinylethers of formula $CF_2$=$CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group comprising one or more ether groups, such as —$C_2F_5$—O—$CF_3$;
functional (per)fluoro-oxyalkylvinylethers of formula $CF_2$=$CFOY_0$, wherein $Y_0$ is a $C_1$-$C_{12}$ alkyl or (per)fluoroalkyl group, a $C_1$-$C_{12}$ oxyalkyl group or a $C_1$-$C_{12}$ (per)fluorooxyalkyl group comprising one or more ether groups and $Y_0$ comprising a carboxylic or sulfonic acid group, in its acid, acid halide or salt form; and
fluorodioxoles, preferably perfluorodioxoles.

The polymer (F) may further comprise at least one hydrogenated monomer [monomer (H)].

By the term "hydrogenated monomer [monomer (H)]" it is hereby intended to denote an ethylenically unsaturated monomer comprising at least one hydrogen atom and free from fluorine atoms.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

Non limitative examples of suitable monomers (H) include, notably, non-fluorinated monomers such as ethylene, propylene, vinyl monomers such as vinyl acetate, (meth)acrylic monomers and styrene monomers such as styrene and p-methylstyrene.

The polymer (F) may be semi-crystalline or amorphous.

The term "semi-crystalline" is hereby intended to denote a polymer (F) having a heat of fusion of from 10 to 90 J/g, preferably of from 30 to 80 J/g, more preferably of from 35 to 75 J/g, as measured according to ASTM D3418-08.

The term "amorphous" is hereby intended to denote a polymer (F) having a heat of fusion of less than 5 J/g, preferably of less than 3 J/g, more preferably of less than 2 J/g as measured according to ASTM D-3418-08.

The polymer (F) is preferably semi-crystalline.

The polymer (F) is preferably selected from the group consisting of:
  polymers (F-1) comprising recurring units derived from vinylidene fluoride (VDF) and, optionally, from at least one fluorinated monomer different from VDF; and
  polymers (F-2) comprising recurring units derived from at least one fluorinated monomer selected from tetrafluoroethylene (TFE) and chlorotrifluoroethylene (CTFE), and from at least one hydrogenated monomer selected from ethylene, propylene and isobutylene, optionally containing one or more additional comonomers, typically in amounts of from 0.01% to 30% by moles, based on the total amount of TFE and/or CTFE and said hydrogenated monomer(s).

The polymer (F-1) preferably comprises:
  (a') at least 60% by moles, preferably at least 75% by moles, more preferably at least 85% by moles of vinylidene fluoride (VDF);
  (b') optionally, from 0.1% to 15% by moles, preferably from 0.1% to 12% by moles, more preferably from 0.1% to 10% by moles of a fluorinated monomer selected from vinyl fluoride (VF$_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
  (c') optionally, from 0.01% to 20% by moles, preferably from 0.05% to 18% by moles, more preferably from 0.1% to 10% by moles of at least one hydrogenated comonomer.

The hydrogenated comonomer (c') of the polymer (F-1) is preferably selected from the group consisting of (meth)acrylic monomers.

The polymer (F-1) more preferably comprises:
  (a') at least 60% by moles, preferably at least 75% by moles, more preferably at least 85% by moles of vinylidene fluoride (VDF);
  (b') from 0.1% to 15% by moles, preferably from 0.1% to 12% by moles, more preferably from 0.1% to 10% by moles of a fluorinated monomer selected from vinyl fluoride (VF$_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and
  (c') optionally, from 0.01% to 20% by moles, preferably from 0.05% to 18% by moles, more preferably from 0.1% to 10% by moles of at least one hydrogenated comonomer.

The polymer (F-2) preferably comprises recurring units derived from ethylene (E) and at least one of chlorotrifluoroethylene (CTFE) and tetrafluoroethylene (TFE).

Polymers (F-2) wherein the fluorinated monomer is chlorotrifluoroethylene (CTFE) and the hydrogenated monomer is ethylene (E) will be identified herein below as ECTFE copolymers; polymers (F-2) wherein the fluorinated monomer is tetrafluoroethylene (TFE) and the hydrogenated monomer is ethylene (E) will be identified herein below as ETFE copolymers.

The polymer (F-2) more preferably comprises:
  (a) from 30% to 60% by moles, preferably from 35% to 55% by moles of ethylene (E);
  (b) from 50% to 70% by moles, preferably from 55% to 65% by moles of at least one fluorinated monomer selected from chlorotrifluoroethylene (CTFE) and tetrafluoroethylene (TFE); and
  (c) from 0.01% to 5% by moles, preferably from 0.05% to 2.5% by moles, based on the total amount of monomers (a) and (b), of one or more additional comonomers.

The comonomer (c) of the polymer (F-2) is preferably selected from the group consisting of hydrogenated monomers, preferably from the group consisting of (meth)acrylic monomers.

Among polymers (F-2), ECTFE copolymers, i.e. copolymers of ethylene and CTFE and, optionally, a third comonomer are preferred.

ECTFE polymers suitable in the process of the invention typically have a melting temperature of at most 250° C. The ECTFE polymer typically has a melting temperature of at least 120° C., preferably of at least 150° C.

The melting temperature is determined by Differential Scanning Calorimetry (DSC) at a heating rate of 10° C./min, according to ASTM D3418.

ECTFE polymers which have been found to give particularly good results are those consisting essentially of recurring units derived from:
  (a) from 35% to 55% by moles of ethylene (E);
  (b) from 55% to 65% by moles of chlorotrifluoroethylene (CTFE).

End chains, defects or minor amounts of monomer impurities leading to recurring units different from those above mentioned can be still comprised in the preferred ECTFE, without this affecting properties of the material.

The polymer (F) is typically manufactured by suspension or emulsion polymerization processes.

The (meth)acrylic monomer preferably complies with formula (I) here below:

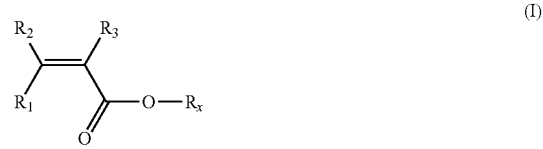

wherein:
  $R_1$, $R_2$ and $R_3$, equal to or different from each other, are independently selected from a hydrogen atom and a $C_1$-$C_3$ hydrocarbon group, and $R_X$ is a hydrogen atom or a $C_1$-$C_5$ hydrocarbon group comprising at least one hydroxyl group.

Determination of average mole percentage of recurring units derived from (meth)acrylic monomers in the polymer (F) can be performed by any suitable method. Mention can be notably made of acid-base titration methods, well suited e.g. for the determination of the acrylic acid content, of NMR methods, adequate for the quantification of (meth) acrylic monomers comprising aliphatic hydrogen atoms in side chains, of weight balance based on total fed (meth) acrylic monomer and unreacted residual (meth)acrylic monomer during polymer (F) manufacture.

The (meth)acrylic monomer more preferably complies with formula (I-A) here below:

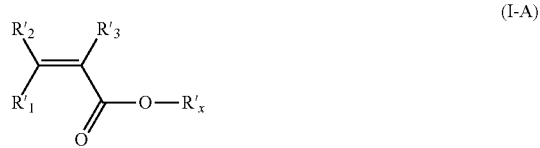

wherein:
$R'_1$, $R'_2$ and $R'_3$ are hydrogen atoms, and
$R'_X$ is a hydrogen atom or a $C_1$-$C_5$ hydrocarbon group comprising at least one hydroxyl group.

Non-limitative examples of suitable (meth)acrylic monomers of formula (I) as defined above include, notably, acrylic acid, methacrylic acid, hydroxyethyl(meth)acrylate, hydroxypropyl(meth)acrylate, hydroxyethylhexyl(meth) acrylate.

For the purpose of the present invention, the term "water-soluble liquid medium [medium ($M_{WS}$)]" is understood to mean one or more liquid solvents having a solubility in water of at least 10% by volume, preferably of at least 50% by volume, more preferably of at least 80% by volume, based on the total volume of water, at 20° C.

The term "liquid" is understood to refer to a substance in its liquid state at 20° C. under atmospheric pressure.

The term "solvent" is used herein in its usual meaning, that is to say that it refers to a substance capable of dissolving another substance (solute) to form a uniformly dispersed mixture at the molecular level. In the case of a polymeric solute, it is common practice to refer to a solution of the polymer in a solvent when the resulting mixture is clear and no phase separation is visible in the system. Phase separation is taken to be the point, often referred to as "cloud point", at which the solution becomes turbid or cloudy due to the formation of polymer aggregates or at which the solution turns into a gel.

The term "gel" is used herein in its usual meaning, that is to say that it refers to a substance which does not flow after changing the position of the vessel in which it is contained.

The term "solubility" is defined herein as the maximum amount of one or more solvents, measured in terms of volume of the solvent per volume of water, which dissolves in water at a given temperature affording a clear homogeneous solution without the presence of any phase separation in the system.

The solubility has been measured according to ASTM D1722-84 standard procedure.

other, are preferably selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, and mixtures thereof.

The expression "$C_1$-$C_{20}$ alkyl" is used according to its usual meaning and it encompasses notably linear, cyclic, branched saturated hydrocarbon chain having from 1 to 20 carbon atoms and preferably from 1 or 2 to 10 carbon atoms.

The expression "$C_1$-$C_{20}$ aryl" is used according to its usual meaning and it encompasses notably aromatic mono- or poly-cyclic groups, preferably mono- or bi-cyclic groups, comprising from 6 to 12 carbon atoms, preferably phenyl or naphthyl.

The expression "$C_1$-$C_{20}$ arylalkyl" is used according to its usual meaning and it encompasses linear, branched or cyclic saturated hydrocarbon groups comprising, as substituent, one or more than one aromatic mono- or poly-cyclic groups, such as, notably benzyl group.

The expression "$C_1$-$C_{20}$ alkylaryl" is used according to its usual meaning and it encompasses aromatic mono- or poly-cyclic groups comprising, as substituent, one or more than one alkyl groups, e.g. one or more than one linear, cyclic, branched saturated hydrocarbon chain having from 1 to 14 carbon atoms and preferably from 1 or 2 to 10 carbon atoms.

In formulae ($I$-$_{de}$) and ($I$-$_{ea}$), $R^1$ and $R^2$, equal to or different from each other, are preferably selected from the group consisting of methyl, ethyl, n-propyl, isopropyl, n-butyl, isobutyl, terbutyl, sec-butyl, 2-ethyl-butyl, n-pentyl, isopentyl, sec-pentyl, cyclopentyl, n-hexyl, isohexyl, sec-hexyl, 2-ethylhexyl, sec-heptyl, 3-methyl-hexyl, 4-methyl-hexyl, 1-ethyl-pentyl, 2-ethyl-pentyl, 3-ethyl-pentyl, n-octyl, isooctyl, 3-methyl-heptyl, n-nonyl, n-decyl, n-undecyl, n-dodecyl, n-tridecyl, n-tetradecyl, n-pentadecyl, cyclohexyl, phenyl and benzyl.

In formulae ($I$-$_{ea}$) and ($I$-$_{da}$), $R^3$, $R^4$, $R^5$ and $R^6$, equal to or different from each other, are preferably selected from the group consisting of $C_1$-$C_{20}$ alkyl, $C_1$-$C_{20}$ aryl, $C_1$-$C_{20}$ alkyaryl, $C_1$-$C_{20}$ arylalkyl groups, all said groups possibly comprising one or more than one substituents, possibly having one or more than one heteroatoms, and of cyclic moieties comprising both $R^3$ and $R^4$ and the nitrogen atom to which they are bound, said cyclic moieties possibly comprising one or more than one heteroatoms, e.g. an oxygen atom or an additional nitrogen atom.

In formula ($I$-$_{ea}$) and ($I$-$_{da}$), $R^3$, $R^4$, $R^5$ and $R^6$, equal to or different from each other, are more preferably selected from the group consisting of methyl, ethyl, hydroxyethyl, n-propyl, isopropyl, n-butyl, isobutyl, terbutyl, n-pentyl, isopentyl, hexyl, cyclohexyl, most preferably from the group consisting of methyl, ethyl and hydroxyethyl.

According to a first embodiment of the process of the invention, the medium ($M_{WS}$) comprises, preferably consists of, at least one solvent selected from the group consisting of esteramides of formula ($I$-$_{ea}$) and diamides of formula ($I$-$_{da}$) as defined above.

According to a variant of this first embodiment of the process of the invention, $A_{ea}$ in formula ($I$-$_{ea}$) and $A_{da}$ in formula ($I$-$_{da}$) equal to or different from each other, are branched $C_3$-$C_{10}$ divalent alkylene groups.

According to this variant, $A_{ea}$ in formula ($I$-$_{ea}$) and $A_{da}$ in formula ($I$-$_{da}$) are preferably selected from the group consisting of:
$A_{MG}$ groups of formula —CH(CH$_3$)—CH$_2$—CH$_2$— (MG$_a$) or —CH$_2$—CH$_2$—CH(CH$_3$)— (MG$_b$),
$A_{ES}$ groups of formula —CH(C$_2$H$_5$)—CH$_2$— (ES$_a$) or —CH$_2$—CH(C$_2$H$_5$)— (ES$_b$), and
mixtures thereof.

According to a preferred variant of this first embodiment of the process of the invention, the medium ($M_{WS}$) comprises, preferably consists of:

at least one esteramide of formula (I'-$_{ea}$),
optionally, at least one esteramide of formula (I"-$_{ea}$),
optionally, at least one esteramide of formula (I'''-$_{ea}$),
optionally, at least one diamide of formula (I'-$_{da}$),
optionally, at least one diamide of formula (I"-$_{da}$), and
optionally, at least one diamide of formula (I'''-$_{da}$),
wherein:
(I'-$_{ea}$) is R$^1$O(O=)C-A$_{MG}$-C(=O)NR$^3$R$^4$,
(I"-$_{ea}$) is R$^1$O(O=)C-A$_{ES}$-C(=O)NR$^3$R$^4$,
(I'''-$_{ea}$) is R$^1$O(O=)C—(CH$_2$)$_4$—C(=O)NR$^3$R$^4$
(I'-$_{da}$) is R$^5$R$^6$N(O=)C-A$_{MG}$-C(=O)NR$^5$R$^6$,
(I"-$_{da}$) is R$^5$R$^6$N(O=)C-A$_{ES}$-C(=O)NR$^5$R$^6$, and
(I'''-$_{da}$) is R$^5$R$^6$N(O=)C—(CH$_2$)$_4$—C(=O)NR$^5$R$^6$,
wherein:
A$_{MG}$ is of formula —CH(CH$_3$)—CH$_2$—CH$_2$— (MG$_a$) or —CH$_2$—CH$_2$—CH(CH$_3$)— (MG$_b$),
A$_{ES}$ is of formula —CH(C$_2$H$_5$)—CH$_2$— (ES$_a$) or —CH$_2$—CH(C$_2$H$_5$)— (ES$_b$); and wherein R$^1$ and R$^2$, equal to or different from each other, are independently selected from the group consisting of C$_1$-C$_{20}$ alkyl, C$_1$-C$_{20}$ aryl, C$_1$-C$_{20}$ alkyaryl, C$_1$-C$_{20}$ arylalkyl groups; R$^3$, R$^4$, R$^5$ and R$^6$, equal to or different from each other, are selected from the group consisting of C$_1$-C$_{20}$ alkyl, C$_1$-C$_{20}$ aryl, C$_1$-C$_{20}$ alkyaryl, C$_1$-C$_{20}$ arylalkyl groups, all said groups possibly comprising one or more than one substituent, possibly having one or more than one heteroatoms, and of cyclic moieties comprising both R$^3$ and R$^4$ or both R$^5$ and R$^6$ and the nitrogen atom to which they are bound, said cyclic moieties possibly comprising one or more than one heteroatoms, e.g. an oxygen atom or an additional nitrogen atom.

In formulae (I'-$_{ea}$), (I"-$_{ea}$), (I'''-$_{ea}$), (I'-$_{da}$), (I"-$_{da}$) and (I'-$_{da}$), R$^1$ is preferably a methyl group, while R$^3$, R$^4$, R$^5$ and R$^6$, equal to or different from each other, are preferably selected from the group consisting of methyl, ethyl and hydroxyethyl groups, more preferably being methyl groups.

According to this variant, the medium (M$_{WS}$) preferably comprises, more preferably consists of, at least one esteramide of formula (I'-$_{ea}$) in combination with any esteramides of any of formulae (I"-$_{ea}$) and (I'''-$_{ea}$) and/or any diamides of any of formulae (I'-$_{da}$), (I"-$_{da}$) and (I'''-$_{da}$).

According to this variant, the medium (M$_{WS}$) more preferably comprises, even more preferably consists of:
(a) an esteramide mixture consisting of:
from 70% to 95% by weight of esteramide of formula (I'-$_{ea}$),
from 5% to 30% by weight of esteramide of formula (I"-$_{ea}$), and
from 0 to 10% by weight of esteramide of formula (I'''-$_{ea}$),
(b) an esteramide/diamide mixture consisting of:
from 70% to 95% by weight of esteramide of formula (I'-$_{ea}$) and from 0.01% to 10% by weight, based on the total weight of (I'-$_{ea}$) and (I"-$_{da}$), of diamide of formula (I"-$_{da}$),
from 5% to 30% by weight of esteramide of formula (I"-$_{ea}$) and from 0.01% to 10% by weight, based on the total weight of (I"-$_{ea}$) and (I"-$_{da}$), of diamide of formula (I"-$_{da}$),
from 0 to 10% by weight of esteramide of formula (I'''-$_{ea}$) and/or diamide of formula (I'''-$_{da}$), or
(c) mixtures of (a) and (b) as defined above.

Non-(imitative examples of suitable media (M$_{WS}$) wherein A$_{ea}$ in formula (I-$_{ea}$) and A$_{da}$ in formula (I-$_{da}$) are branched C$_3$-C$_{10}$ divalent alkylene groups include, notably, RHODIASOLV® POLARCLEAN solvent commercially available from SOLVAY SA.

Esteramides of formula (I-$_{ea}$) and/or diamides of formula (I-$_{da}$) which can be used in the medium (M$_{WS}$) of the process of the invention can be prepared notably according to the teachings of WO 2009/092795 (RHODIA OPERATIONS) 30 Jul. 2009.

According to a second embodiment of the process of the invention, the medium (M$_{WS}$) comprises, preferably consists of, at least one solvent selected from the group consisting of diesters of formula (I-$_{de}$) as defined above.

According to this second embodiment of the process of the invention, A$_{de}$ in formula (I-$_{de}$) is a C$_3$-C$_{10}$ divalent alkylene group comprising one or more ether oxygen atoms, preferably a C$_3$-C$_6$ divalent alkylene group comprising one or more ether oxygen atoms.

According to a first variant of this second embodiment of the process of the invention, the medium (M$_{WS}$) comprises, preferably consists of, at least one solvent selected from the group consisting of diesters of formula (II'-$_{de}$):
R$^1$(O=)CO—(CH$_2$—CH$_2$—O)$_n$—CH$_2$CH$_2$—OC(=O) R$^2$ (II'-$_{de}$) wherein n is an integer comprised between 1 and 2, preferably n being 2, and R$^1$ and R$^2$, equal to or different from each other, are C$_1$-C$_{20}$ alkyl groups.

Non-limitative examples of suitable diesters of formula (II'-$_{de}$) include, notably, those of formula (II"-$_{de}$):
R$^1$ (O=)CO—(CH$_2$—CH$_2$—O)$_2$—CH$_2$CH$_2$—OC(=O) R$^2$ (II"-$_{de}$) wherein R$^1$ and R$^2$ are methyl groups.

Diesters of formula (II"-$_{de}$) which can be used in the medium (M$_{WS}$) of the process of the invention are commercially available by Sigma Aldrich or by Tokyo Chemical Industry Co.

The medium (M$_{WS}$) is advantageously free from dimethyl sulphoxide (DMSO).

The medium (M$_{WS}$) is preferably free from solvents qualified as Carcinogenic, Mutagenic or Toxic to Reproduction according to chemical safety classification (CMR solvents); more specifically, the medium (M$_{WS}$) is advantageously substantially free from N-methyl pyrrolidone (NMP), N,N-dimethylformamide (DMF) and N,N-dimethylacetamide (DMAc).

A medium (M$_{WS}$) consisting of at least one solvent selected from the group consisting of diesters of formula (I-$_{ea}$) esteramides of formula (I-$_{ea}$) and diamides of formula (I-$_{da}$) as defined above is preferred.

Under step (i) of the process of the invention, the composition (C) is typically manufactured by any conventional techniques. For instance, the medium (M$_{WS}$) can be added to the polymer (F), or, preferably, the polymer (F) can be added to the medium (M$_{WS}$), or even the polymer (F) and the medium (M$_{WS}$) can be simultaneously combined.

Any suitable mixing equipment may be used. Preferably, the mixing equipment is selected to reduce the amount of air entrapped in the composition (C) which may cause defects in the final membrane. The mixing of the polymer (F) and the medium (M$_{WS}$) may be conveniently carried out in a sealed container, optionally held under an inert atmosphere. Inert atmosphere, and more precisely nitrogen atmosphere has been found particularly advantageous for the manufacture of the composition (C).

The composition (C) typically comprises at least one polymer (F) in an amount of at least 10% by weight, preferably of at least 15% by weight, based on the total weight of the composition (C). The composition (C) typically comprises at least one polymer (F) in an amount of at most 35% by weight, preferably of at most 30% by weight, based on the total weight of the composition (C).

The composition (C) may contain one or more additional components, such as pore forming agents, nucleating agents, fillers and the like.

Pore forming agents are typically added to the composition (C) in amounts usually ranging from 0.1% to 5% by weight, preferably from 0.5% to 3% by weight. Suitable pore forming agents are for instance polyvinylpyrrolidone (PVP) and polyethyleneglycol (PEG), with PVP being preferred.

Pore forming agents are generally at least partially, if not completely, removed from the fluoropolymer membrane in the medium ($M_{NS}$) under step (iv) of the process of the invention.

Further, in addition, a limited amount of a non-solvent medium for polymer
(F) may be added to the composition (C) provided in step (i) of the process of the invention, in an amount generally below the level required to reach the cloud point, typically less than 40% by weight, preferably less than 25% by weight, based on the total weight of the composition (C). Such non-solvent medium will be generally the same as the one used in step (iv) of the process of the invention.

Without being bound by this theory, it is generally understood that the addition of a non-solvent medium to the composition (C) will increase the rate of demixing/coagulation under step (iv) of the process of the invention thereby providing a more advantageous membrane morphology.

Under step (ii) of the process of the invention, the temperature of processing of the composition (C) shall be at least 100° C. so that the composition (C) can maintain adequate solubility and viscosity properties.

Under step (ii) of the process of the invention, conventional techniques can be used for processing the composition (C) thereby providing a film.

Under step (ii) of the process of the invention, the composition (C) is typically processed by using casting techniques.

Under step (ii) of the process of the invention, the composition (C) is commonly processed at a temperature of at least 100° C. typically by stirring thereby providing a clear homogenous composition (C) followed by casting of the composition (C) so obtained thereby providing a film.

Under step (ii) of the process of the invention, the composition (C) is processed at a temperature of at least 100° C., preferably of at least 120° C., more preferably of at least 140° C. The composition (C) is typically processed at a temperature of advantageously less than 250° C., preferably less than 220° C., more preferably less than 190° C.

Under step (ii) of the process of the invention, the mixing time during stirring required to obtain a clear homogeneous composition (C) can vary widely depending upon the rate of dissolution of the components, the temperature, the efficiency of the mixing apparatus, the viscosity of the composition (C) and the like.

Under step (ii) of the process of the invention, the solubility of the polymer (F) in the medium ($M_{WS}$) at a temperature of at least 100° C. is advantageously greater than 5% by volume, preferably greater than 10% by volume, more preferably greater than 15% by volume, based on the total volume of the composition (C).

The term "solubility" is defined herein as the maximum amount of polymer (F), measured in terms of volume of the polymer (F) per volume of composition (C), which dissolves in the medium ($M_{WS}$) at a given temperature affording a clear homogeneous solution without the presence of any phase separation in the system.

Once a clear homogenous composition (C) is prepared under step (ii) of the process of the invention, the composition (C) is typically processed by casting thereby providing a film.

The term "film" is used herein to refer to a layer of composition (C) obtained after processing of the same under step (ii) of the process of the invention. The term "film" is used herein in its usual meaning, that is to say that it refers to a discrete, generally thin, dense layer.

Depending on the final form of the membrane, the film may be either flat, when flat membranes are required, or tubular in shape, when tubular or hollow fiber membranes are required.

Under step (ii) of the process of the invention, the temperature at which the composition (C) is processed by casting may be or may be not the same as the temperature at which the composition (C) is mixed under stirring.

Different casting techniques are used depending on the final form of the membrane to be manufactured.

When the final product is a flat membrane, the polymer solution is cast as a film over a flat supporting substrate, typically a plate, a belt or a fabric, or another microporous supporting membrane, typically by means of a casting knife or a draw-down bar.

According to a first embodiment of the process of the invention, under step (ii) the composition (C) is processed by casting onto a flat supporting substrate thereby providing a flat film.

According to a second embodiment of the process of the invention, under step (ii) the composition (C) is processed by casting onto a tubular supporting substrate thereby providing a tubular film.

According to a variant of this second embodiment of the process of the invention, the tubular supporting substrate is a spinneret.

The term "spinneret" is hereby understood to mean an annular nozzle comprising at least two concentric capillaries: a first outer capillary for the passage of the composition (C) and a second inner one for the passage of a supporting fluid, generally referred to as "lumen".

Hollow fibers and capillary membranes can be obtained by the so-called spinning process according to this variant of the second embodiment of the process of the invention. According to this variant of the second embodiment of the process of the invention, the composition (C) is generally pumped through the spinneret. The lumen acts as the support for the casting of the composition (C) and maintains the bore of the hollow fiber or capillary precursor open. The lumen may be a gas, or, preferably, a liquid at the conditions of the spinning of the fiber. The selection of the lumen and its temperature depends on the required characteristics of the final membrane as they may have a significant effect on the size and distribution of the pores in the membrane.

At the exit of the spinneret, after a short residence time in air or in a controlled atmosphere, under step (iv) of the process of the invention, the hollow fiber or capillary precursor is immersed in the medium ($M_{NS}$) wherein the polymer (F) precipitates forming the hollow fiber or capillary membrane.

The supporting fluid forms the bore of the final hollow fiber or capillary membrane. When the supporting fluid is a liquid, immersion of the fiber precursor in the medium ($M_{NS}$) under step (iv) of the process of the invention also advantageously removes the supporting fluid from the interior of the fiber.

Tubular membranes, because of their larger diameter, are generally manufactured using a different process from the one employed for the production of hollow fiber membranes.

After the processing of the composition (C) has been completed thereby providing a film, in whichever form, as defined above, under step (iii) of the process of the invention said film is cooled to a temperature below 50° C., preferably below 30° C., typically using any conventional techniques.

This step is generally effective for inducing the precipitation of the polymer (F) from the composition (C).

Under step (iii) of the process of the invention, cooling can be performed upon exposure of the film provided in step (ii) under air, typically having a relative humidity higher than 10%, preferably higher than 50%, at a temperature below 50° C., preferably below 30° C.

Under step (iii) of the process of the invention, cooling can alternatively be performed by contacting the film provided in step (ii) of the process of the invention with a liquid medium at a temperature below 50° C., preferably below 30° C. The liquid medium is typically selected from the group consisting of the medium ($M_{WS}$) of step (i) of the process of the invention, the medium ($M_{NS}$) of step (iv) of the process of the invention and mixtures thereof.

For the purpose of the present invention, by the term "non-solvent medium [medium ($M_{NS}$)]" it is meant a medium consisting of one or more liquid substances incapable of dissolving a given component of a solution or mixture at a given temperature.

Under step (iv) of the process of the invention, the film provided in step (iii) is contacted with the medium ($M_{NS}$) thereby providing a fluoropolymer membrane.

The medium ($M_{NS}$) may comprise water and/or at least one solvent selected from the group consisting of diesters of formula ($I$-$_{de}$), esteramides of formula ($I$-$_{ea}$) and diamides of formula ($I$-$_{da}$) as defined above.

The medium ($M_{NS}$) may further comprise one or more alcohols or polyalcohols, preferably aliphatic alcohols having a short chain, for example from 1 to 6 carbon atoms, more preferably methanol, ethanol, isopropanol and ethylene glycol.

The medium ($M_{NS}$) is generally selected among those miscible with the medium (Ms) used for the preparation of composition (C). More preferably, the medium ($M_{NS}$) consists of water. Water is the most inexpensive non-solvent and it can be used in large amounts. The medium ($M_{WS}$) is advantageously soluble in water, which is an additional advantage of the process of the present invention.

Under step (iv) of the process of the invention, the medium ($M_{NS}$) is usually held at a temperature of at least 0° C., preferably of at least 15° C., more preferably of at least 20° C. The medium ($M_{NS}$) is usually held at a temperature of less than 90° C., preferably of less than 70° C., more preferably of less than 60° C.

Once removed from the medium ($M_{NS}$) under step (iv) of the process of the invention, the fluoropolymer membrane may undergo additional post treatment steps, for instance rinsing.

Under step (v) of the process of the invention, if any, the fluoropolymer membrane is dried, preferably at a temperature of at least 30° C.

Drying can be performed under air or a modified atmosphere, e.g. under an inert gas, typically exempt from moisture (water vapour content of less than 0.001% v/v). Drying can alternatively be performed under vacuum.

The temperature gradient between the film provided in any one of steps (ii) and (iii) of the process of the invention and the medium ($M_{NS}$) may influence the pore size and/or pore distribution in the final fluoropolymer membrane as it generally affects the rate of precipitation of the polymer (F) from the composition (C).

The Applicant has found that use of solvent/non-solvent mixtures in any one of steps (ii), (iii) and (iv) of the process of the invention at a given temperature advantageously allows controlling the morphology of the final fluoropolymer membrane including its porosity.

The fluoropolymer membrane obtainable by the process of the invention is typically a porous membrane.

The fluoropolymer membrane obtainable by the process of the invention may be either a symmetric membrane or an asymmetric membrane.

The fluoropolymer membrane obtainable by the process of the invention is typically an asymmetric membrane.

The asymmetric fluoropolymer membrane obtainable by the process of the invention typically consists of one or more layers containing pores which are heterogeneously distributed throughout their thickness.

The asymmetric fluoropolymer membrane obtainable by the process of the invention typically comprise an outer layer containing pores having an average pore diameter smaller than the average pore diameter of the pores in one or more inner layers.

The fluoropolymer membrane of the invention typically has an average porosity comprised between 5% and 90%, preferably between 10% and 85% by volume, based on the total volume of the membrane.

The fluoropolymer membrane of the invention typically has an average pore diameter of at least 0.001 μm, of at least 0.005 μm, of at least 0.01 μm and of at most 50 μm.

It has been also found that the fluoropolymer membrane of the invention is advantageously provided with outstanding mechanical properties combined with outstanding water permeability properties.

The fluoropolymer membrane of the invention typically has an elongation at break of at least 50%, as measured according to ASTM D638-10 standard procedure.

The fluoropolymer membrane of the invention typically has a water permeability of at least 500 L/h×m².

The water permeability of porous membranes can be measured according to any suitable techniques.

Should the disclosure of any patents, patent applications, and publications which are incorporated herein by reference conflict with the description of the present application to the extent that it may render a term unclear, the present description shall take precedence.

The invention will be now described in more details with reference to the following examples, whose purpose is merely illustrative and not intended to limit the scope of the invention.

Raw Materials

SOLEF® 1015 PVDF is a PVDF homopolymer commercially available from Solvay Specialty Polymers Italy S.p.A.

Triethylene glycol diacetate (TEGDA) has formula $H_3C(O=)CO—(CH_2CH_2O)_3—C(=O)CH_3$ (100% by volume soluble in water at 25° C.).

RHODIASOLV® POLARCLEAN solvent.

Acetyl tributyl citrate (ATBC) has formula $H_3C(O=)CO—C—[C(=O)O—CH_2CH_2CH_2CH_3]_3$ (insoluble in water in all proportions).

Polyvinylpyrrolidone having a molecular weight of about 1360000 (PVP).

Measurement of Water Solubility

The solubility of the solvents in water has been measured according to ASTM D1722-84 standard procedure.

Measurement of Average Porosity

The average porosity of a porous membrane is a measure of the volume of the pores by the total volume of the porous membrane.

The average porosity of membranes has been measured using kerosene as wetting fluid according to the procedure notably described in SMOLDERS, K., et al. Terminology for Membrane Distillation. *Desalination* 1989, vol. 72, p. 249-262.

Measurement of Average Pore Diameter

The average pore diameter in membranes has been measured according to ASTM F316-03 standard procedure using an automated capillary flow porometer instrument (CFP-1500-AE, Porous Materials, Inc.).

Measurement of Water Permeability

The pure water flux (PWF) has been measured on membranes preliminarily wetted by water at a pressure of 0.4 MPa for 5 minutes. The PWF has been measured using a AMICON® 8050 stirred cell (effective area 12.6 cm$^2$, Millipore Corporation) at a transmembrane pressure (TMP) of 0.1 MPa.

Measurement of Mechanical Properties

Mechanical properties have been measured according to ASTM D638-10 standard procedure using testing machine AGS-J 500N (Shimadzu).

EXAMPLE 1

A 15% by weight solution was prepared by dissolving 15 g of SOLEF® 1015 PVDF in 85 g of TEGDA at 160° C. for 2 hours under mechanical stirring. Then, the solution was cast over a glass slide kept at 30° C. to form a film having a thickness of about 200 μm. The film was then allowed to solidify in air for 120 min at 30° C.; after this solidification time, the film and the glass slide were immersed for one day in a deionized water bath to extract the TEGDA. Then, the film was dried for two days in air at 50° C.

The membrane so obtained had a porosity of 75%, an average pore diameter of 0.11 μm, a water permeability of 2342 L/h×m$^2$, a stress at break of 2.1 MPa and an elongation at break of 471%.

EXAMPLE 2

A porous membrane was prepared according to Example 1 by dissolving 20 g of SOLEF® 1015 PVDF in 80 g of TEGDA.

The membrane so obtained had a porosity of 72%, an average pore diameter of 0.08 μm, a water permeability of 665 L/h×m$^2$, a stress at break of 0.9 MPa and an elongation at break of 63%.

EXAMPLE 3

A 30% by weight solution was prepared by dissolving 300 g of SOLEF® 1015 PVDF and 50 g of PVP in 850 g of RHODIASOLV® POLARCLEAN solvent at 160° C. for 2 hours under mechanical stirring. After keeping the homogeneous solution so obtained at 160° C. for 3 hours without mixing for degassing, the solution was extruded through a spinneret maintained at 160° C., said spinneret comprising an outer tube and an inner tube having a diameter of 1.53 mm and 0.6 mm, respectively, by a gear pump under a nitrogen pressure of 0.3 MPa to a coagulation bath maintained at 15° C. A diluent was introduced into the inner orifice of the spinneret at 160° C. to act as lumen. The bore flow and the dope flow rate were 12 mL/min and 10 mL/min, respectively.

The hollow fibers thereby provided were then immersed in water at 25° C. in order to ensure complete removal of the lumen and then washed with a 4000 ppm solution of sodium hypochlorite buffered to pH 7 in order to remove PVP.

The hollow fiber so obtained had a porosity of 81%, a water permeability of 750 L/h×m$^2$, a stress at break of 1.0 MPa and an elongation at break of 72%.

COMPARATIVE EXAMPLE 1

A 15% by weight solution was prepared by dissolving 15 g of SOLEF® 1015 PVDF in 85 g of ATBC at 180° C. for 2 hours under mechanical stirring. Then, the solution was cast over a glass slide kept at 30° C. to form a film having a thickness of about 200 μm. The film was then allowed to solidify in air for 30 min at 50° C.; after this solidification time, the film and the glass slide were immersed overnight in 1 lt. of ethanol to extract the diluent. Then, the film was dried for two days in air at 40° C. The membrane so obtained had a porosity of 76%, an average pore diameter of 0.56 μm, a water permeability of 3200 L/h×m$^2$, a stress at break of 1.0 MPa and an elongation at break of 9%.

COMPARATIVE EXAMPLE 2

A 20% by weight solution was prepared by dissolving 20 g of SOLEF® 1015 PVDF in 80 g of ATBC at 180° C. for 2 hours under mechanical stirring. Then, the solution was cast using the small casting machine over a glass slide kept at 30° C. to form a film having a thickness of about 200 μm. The film was then allowed to solidify in air for 30 min at 50° C.; after this solidification time, the film and the glass slide were immersed overnight in 1 lt. of ethanol to extract the diluent. Then, the film was dried for two days in air at 40° C.

The membrane so obtained had a porosity of 76%, an average pore diameter of 0.35 μm, a water permeability of 2550 L/h×m$^2$, a stress at break of 0.9 MPa and an elongation at break of 14%.

As shown in Table 1 here below, the membranes obtained according to the process of the invention as notably exemplified by Examples 1, 2 and 3 advantageously have outstanding water permeability properties combined with outstanding mechanical properties, in particular enhanced elongation at break values, while having a relatively low average pore diameter.

TABLE 1

| Run | Porosity [%] | Average pore diameter [μm] | Water permeability [L/h × m2] | Stress at break [MPa] | Elongation at break [%] |
|---|---|---|---|---|---|
| Ex. 1 | 75 | 0.11 | 2342 | 2.1 | 471 |
| Ex. 2 | 72 | 0.08 | 665 | 0.9 | 63 |
| Ex. 3 | 81 | — | 750 | 1.0 | 72 |
| C. Ex. 1 | 76 | 0.56 | 3200 | 1.0 | 9 |
| C. Ex. 2 | 76 | 0.35 | 2550 | 0.9 | 14 |

The invention claimed is:
1. A process for manufacturing a fluoropolymer membrane, said process comprising:
   processing a composition (C) at a temperature of at least 100° C. thereby providing a film, wherein composition (C) comprises:

at least one fluoropolymer [polymer (F)],
a water-soluble liquid medium ($M_{WS}$) that is free from dimethyl sulphoxide (DMSO) and comprises at least one solvent selected from the group consisting of diesters of formula (I-$_{de}$), esteramides of formula (I-$_{ea}$) and diamides of formula (I-$_{da}$):

  (I-$_{de}$)

  (I-$_{ea}$)

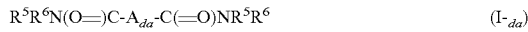  (I-$_{da}$)

wherein:
- $R^1$ and $R^2$, equal to or different from each other, are independently selected from the group consisting of $C_1$-$C_{20}$ hydrocarbon groups;
- $R^3$, $R^4$, $R^5$ and $R^6$, equal to or different from each other, are independently selected from the group consisting of hydrogen, optionally substituted $C_1$-$C_{36}$ hydrocarbon groups, wherein $R^3$ and $R^4$ optionally form a cyclic moiety including the nitrogen atom to which they are bound, and wherein $R^5$ and $R^6$ optionally form a cyclic moiety including the nitrogen atom to which they are bound, wherein each cyclic moiety is optionally substituted and/or optionally comprises one or more than one additional heteroatoms,
- $A_{de}$ is a $C_3$-$C_{10}$ divalent alkylene group comprising one or more ether oxygen atoms,
- $A_{ea}$ and $A_{da}$, equal to or different from each other, are independently $C_3$-$C_{10}$ divalent alkylene groups, optionally comprising one or more ether oxygen atoms and/or one or more functional side groups;

cooling the film to a temperature below 50° C. to form a cooled film;
contacting the cooled film with a non-solvent medium ($M_{NS}$) thereby providing a fluoropolymer membrane; and
optionally, drying the fluoropolymer membrane.

2. The process according to claim 1, wherein polymer (F) comprises recurring units derived from at least one fluorinated monomer (F).

3. The process according to claim 1, wherein polymer (F) is selected from the group consisting of:
- polymers (F-1) comprising recurring units derived from vinylidene fluoride (VDF) and, optionally, from at least one fluorinated monomer different from VDF; and
- polymers (F-2) comprising recurring units derived from at least one fluorinated monomer selected from tetrafluoroethylene (TFE) and chlorotrifluoroethylene (CTFE), and from at least one hydrogenated monomer selected from ethylene, propylene and isobutylene, optionally containing one or more additional comonomers, in amounts of from 0.01% to 30% by moles, based on the total amount of TFE and/or CTFE and said hydrogenated monomer(s).

4. The process according to claim 1, wherein the medium ($M_{WS}$) comprises at least one solvent selected from the group consisting of esteramides of formula (I-$_{ea}$) and diamides of formula (I-$_{da}$), wherein $A_{ea}$ in formula (I-$_{ea}$) and $A_{da}$ in formula (I-$_{da}$), equal to or different from each other, are branched $C_3$-$C_{10}$ divalent alkylene groups.

5. The process according to claim 1, wherein the medium ($M_{WS}$) comprises at least one solvent selected from the group consisting of diesters of formula (I-$_{de}$), wherein $A_{de}$ in formula (I-$_{de}$) is a $C_3$-$C_{10}$ divalent alkylene group comprising one or more ether oxygen atoms.

6. The process according to claim 5, wherein the medium ($M_{WS}$) comprises at least one solvent selected from the group consisting of diesters of formula (II'-de):

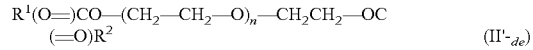  (II'-$_{de}$)

wherein n is an integer comprised between 1 and 2 and $R^1$ and $R^2$, equal to or different from each other, are $C_1$-$C_{20}$ alkyl groups.

7. The process according to claim 1, wherein composition (C) is processed by using casting techniques.

8. The process according to claim 7, wherein composition (C) is processed by casting onto a flat supporting substrate thereby providing a flat film.

9. The process according to claim 7, wherein composition (C) is processed by casting onto a tubular supporting substrate thereby providing a tubular film.

10. The process according to claim 1, wherein cooling is performed upon exposure of the film to air having a relative humidity higher than 10% at a temperature below 50° C.

11. The process according to claim 1, wherein cooling is performed by contacting the film with a liquid medium at a temperature below 50° C.

12. The process according to claim 1, wherein medium ($M_{NS}$) comprises water and/or at least one solvent selected from the group consisting of diesters of formula (I-$_{de}$), esteramides of formula (I-$_{ea}$) and diamides of formula (I-$_{da}$).

13. The process according to claim 1, wherein the fluoropolymer membrane is dried at a temperature of at least 30° C.

14. A fluoropolymer membrane obtainable by the process according to claim 1.

15. The fluoropolymer membrane according to claim 14, said membrane being a symmetric membrane.

16. A filtration membrane comprising the fluoropolymer membrane according to claim 14.

17. A separator membrane for electrochemical devices comprising the fluoropolymer membrane according to claim 14.

18. The fluoropolymer membrane according to claim 14, said membrane being an asymmetric membrane.

19. The process according to claim 1, wherein composition (C) consists of
- at least one polymer (F), and
- the water-soluble liquid medium ($M_{WS}$), wherein medium ($M_{WS}$) consists of at least one solvent selected from the group consisting of diesters of formula (I-$_{de}$), esteramides of formula (I-$_{ea}$) and diamides of formula (I-$_{da}$).

20. The process according to claim 19, wherein the medium ($M_{WS}$) consists of at least one solvent selected from the group consisting of diesters of formula (II'-de):

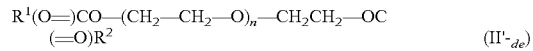  (II'-$_{de}$)

wherein n is an integer comprised between 1 and 2 and $R^1$ and $R^2$, equal to or different from each other, are $C_1$-$C_{20}$ alkyl groups.

* * * * *